(12) United States Patent
Aikas et al.

(10) Patent No.: US 9,148,332 B2
(45) Date of Patent: Sep. 29, 2015

(54) CONTENT DELIVERY NETWORK

(75) Inventors: Erkki Ville Juhani Aikas, Seattle, WA (US); Amit Agarwal, Fremont, CA (US); Brian N. Bershad, Seattle, WA (US)

(73) Assignee: Google Inc., Mountain View, CA (US)

(*) Notice: Subject to any disclaimer, the term of this patent is extended or adjusted under 35 U.S.C. 154(b) by 662 days.

(21) Appl. No.: 12/956,574

(22) Filed: Nov. 30, 2010

(65) Prior Publication Data

US 2011/0289126 A1 Nov. 24, 2011

Related U.S. Application Data

(60) Provisional application No. 61/346,166, filed on May 19, 2010.

(51) Int. Cl.
*G06F 17/30* (2006.01)
*H04L 29/08* (2006.01)

(52) U.S. Cl.
CPC .... *H04L 29/08729* (2013.01); *G06F 17/30132* (2013.01); *H04L 67/1097* (2013.01); *H04L 67/02* (2013.01)

(58) Field of Classification Search
USPC .......................................................... 707/736
See application file for complete search history.

(56) References Cited

U.S. PATENT DOCUMENTS

| 7,185,047 | B1* | 2/2007 | Bate et al. ...................... 709/202 |
| 7,203,731 | B1 | 4/2007 | Coates et al. |
| 8,341,694 | B2* | 12/2012 | Hinton et al. ...................... 726/2 |
| 2002/0099818 | A1 | 7/2002 | Russell et al. |
| 2008/0155111 | A1 | 6/2008 | Takeuchi et al. |
| 2008/0228772 | A1* | 9/2008 | Plamondon ...................... 707/10 |
| 2009/0287842 | A1 | 11/2009 | Plamondon |
| 2010/0111059 | A1 | 5/2010 | Bappu et al. |

OTHER PUBLICATIONS

R. Fielding et al, Hypertext Transfer Protocol—HTTP/1.1, Jun. 1999, The Internet Society, http://www.ietf.org/rfc/rfc2616.txt.*
Mark Nottingham, Caching Tutorial for Web Authors and Webmasters, 1998, http://www.mnot.net/cache_docs/.*
International Search Report and Written Opinion for International Application No. PCT/US11/36829, mailed Aug. 30, 2011, 12 pages.

* cited by examiner

*Primary Examiner* — James Trujillo
*Assistant Examiner* — Kurt Mueller
(74) *Attorney, Agent, or Firm* — Fish & Richardson P.C.

(57) ABSTRACT

A request to store a data object is received at a hosted storage service. The request includes the data object and an associated object reference. The object reference configured to enable retrieval of the data object from the hosted storage service. The data object is stored at the hosted storage service in association with the object reference. The data object is sent from the hosted storage service to a content delivery network node such that the data object is cached in and retrievable from the content delivery network node using the object reference.

21 Claims, 6 Drawing Sheets

CONTENT DELIVERY NETWORK

CLAIM OF PRIORITY

This application claims priority under to U.S. Patent Application Ser. No. 61/346,166, filed on May 19, 2010, the entire contents of which are hereby incorporated by reference.

TECHNICAL FIELD

This document relates to content delivery.

BACKGROUND

Hosted, or cloud-based, storage refers to off-site or remote data storage that is typically provided by a third party. The third party may implement the hosted storage in a data center, and provide access to the hosted storage over a network, such as the Internet.

SUMMARY

In one aspect, a request to store a data object is received at a hosted storage service. The request is associated with the data object and an object reference. The object reference enables retrieval of the data object from the hosted storage service. The data object is stored in association with the object reference at the hosted storage service. The data object is sent from the hosted storage service to a content delivery network node such that the data object is cached in and retrievable from the content delivery network node using the object reference.

Implementations may include one or more of the following features. Sending the data object from the hosted storage service to the content delivery network node may include sending the data object from the hosted storage service to the content delivery network node without requiring a user to request the sending of the object from the hosted storage service to the content delivery network node. Sending the data object from the hosted storage service to the content delivery network node such that the data object is cached in the content delivery network may be performed without action by an owner of the data object other than causing the data object to be stored in the hosted storage service and designated as publicly accessible.

Sending the data object from the hosted storage service to a content delivery network node may include receiving a request to retrieve the data object at the content delivery network node, the request to retrieve the data object including the object reference; determining, at the content delivery network node, that the data object is not cached at the content delivery network node; in response to determining that the data object is not cached at the content delivery network node, sending a request for the data object from the content delivery network node to the hosted storage service, the request for the data object including the object reference; receiving the request for the data object at the hosted storage service; retrieving the data object at the hosted storage service using the object reference received with the request for the data object; and sending the retrieved data object to the content delivery network node such that the data object is cached in and retrievable from the content delivery network node using the object reference. Sending the retrieved data object to the content delivery network such that the data object is cached may include sending the data object with a cache header that indicates the object is cacheable.

The content delivery network node may include a primary cache configured to cache data objects below a threshold size and a secondary cache configured to cache data objects above the threshold size.

The data object may be above the threshold size and sending the data object from the hosted storage service to a content delivery network node may include receiving a request to retrieve the data object at the primary cache, the request to retrieve the data object including the object reference; determining, at the primary cache, that the data object is not cached at the primary cache; in response to determining that the data object is not cached at the primary cache, sending a first request for the data object from the primary cache to the hosted storage service, the first request for the data object including the object reference; receiving the first request for the data object at the hosted storage service; determining that the data object is above the threshold size and that the first request was received from the primary cache; in response to determining that the data object is above the threshold size and that the first request was received from the primary cache, redirecting the request to retrieve the data object to the secondary cache; receiving the redirected request to retrieve the data object at the secondary cache, the redirected request to retrieve the data object including the object reference; determining, at the secondary cache, that the data object is not cached at the secondary cache; in response to determining that the data object is not cached at the secondary cache, sending a second request for the data object from the secondary cache to the hosted storage service, the second request for the data object including the object reference; retrieving the data object at the hosted storage service using the object reference received with the second request for the data object; and sending the retrieved data object to the secondary cache such that the data object is cached in and retrievable from the secondary cache using the object reference.

A request for the data object may be received from a client system and at the content delivery network node. The request may include the object reference. The data object cached at the content delivery network node may be retrieved using the object reference received with the request for the data object. The retrieved data object may be sent to the client system. The object reference may include a bucket name and an object name.

In another aspect, a system includes one or more processing devices and one or more storage devices storing instructions that, when executed by the one or more processing devices, cause the one or more processing devices to receive, at a hosted storage service, a request to store a data object, wherein the request is associated with the data object and an object reference, the object reference enabling retrieval of the data object from the hosted storage service; store, at the hosted storage service, the data object in association with the object reference; and send the data object from the hosted storage service to a content delivery network node such that the data object is cached in and retrievable from the content delivery network node using the object reference.

Implementations may include one or more of the following features or one or more of the features noted above. To send the data object from the hosted storage service to the content delivery network node, the instructions may include instructions that cause the one or more processing devices to send the data object from the hosted storage service to the content delivery network node without requiring a user to request the sending of the object from the hosted storage service to the content delivery network node.

The instructions may cause the one or more processing devices to perform the sending of the data object from the hosted storage service to the content delivery network node such that the data object is cached in the content delivery network without action by an owner of the data object other than causing the data object to be stored in the hosted storage service and designated as publicly accessible.

To send the data object from the hosted storage service to a content delivery network node, the instructions may include instructions that cause the one or more processing devices to receive a request to retrieve the data object at the content delivery network node, the request to retrieve the data object including the object reference; determine, at the content delivery network node, that the data object is not cached at the content delivery network node; in response to determining that the data object is not cached at the content delivery network node, send a request for the data object from the content delivery network node to the hosted storage service, the request for the data object including the object reference; receive the request for the data object at the hosted storage service; retrieve the data object at the hosted storage service using the object reference received with the request for the data object; and send the retrieved data object to the content delivery network node such that the data object is cached in and retrievable from the content delivery network node using the object reference.

To send the retrieved data object to the content delivery network such that the data object is cached, the instructions may include instructions that cause the one or more processing devices to send the data object with a cache header that indicates the object is cacheable.

The content delivery network node may include a primary cache configured to cache data objects below a threshold size and a secondary cache configured to cache data objects above the threshold size. The data object may be above the threshold size and, to send the data object from the hosted storage service to a content delivery network node, the instructions may include instructions that cause the one or more processing devices to receive a request to retrieve the data object at the primary cache, the request to retrieve the data object including the object reference; determine, at the primary cache, that the data object is not cached at the primary cache; in response to determining that the data object is not cached at the primary cache, send a first request for the data object from the primary cache to the hosted storage service, the first request for the data object including the object reference; receive the first request for the data object at the hosted storage service; determine that the data object is above the threshold size and that the first request was received from the primary cache; in response to determining that the data object is above the threshold size and that the first request was received from the primary cache, redirect the request to retrieve the data object to the secondary cache; receive the redirected request to retrieve the data object at the secondary cache, the redirected request to retrieve the data object including the object reference; determine, at the secondary cache, that the data object is not cached at the secondary cache; in response to determining that the data object is not cached at the secondary cache, send a second request for the data object from the secondary cache to the hosted storage service, the second request for the data object including the object reference; retrieve the data object at the hosted storage service using the object reference received with the second request for the data object; and send the retrieved data object to the secondary cache such that the data object is cached in and retrievable from the secondary cache using the object reference.

The instructions may include instructions that cause the one or more processing devices to receive, from a client system and at the content delivery network node, a request for the data object, the request including the object reference; retrieve the data object cached at the content delivery network node using the object reference received with the request for the data object; and send the retrieved data object to the client system. The object reference may include a bucket name and an object name.

In another aspect, a system includes a hosted storage service, a content delivery network node, and a client system. The hosted storage service stores a data object in association with an object reference. The hosted storage service is configured to send the data object from the hosted storage service to a content delivery network node such that the data object is cached in and retrievable from the content delivery network node using the object reference. T content delivery network node is configured to receive the data object sent from the host storage service and cache the received data object such that the data object is retrievable from the content delivery network node using the object reference. The client system is configured to send a request for the data object, including the object reference, to the content delivery network node such that the content delivery network node retrieves the cached data object using the object reference and sends the cached data object to the client system.

Implementations may include one or more of the following features or one or more of the features noted above. For example, the host storage service may configured to send the data object to the content delivery network node without requiring a user to request the sending of the object from the hosted storage service to the content delivery network node. The details of one or more implementations are set forth in the accompanying drawings and the description below. Other features and advantages will be apparent from the description and drawings, and from the claims.

DETAILED DESCRIPTION

A service provider may provide a hosted, or cloud-based, storage service into which users (for example, stand-alone or web-based application developers) can store objects, and an associated Content Delivery Network (CDN) that provides caching of stored objects in one or more CDN nodes. In some implementations, to take advantage of the CDN, a user simply needs to store an object in the hosted storage service and set the appropriate permissions. In this case, the caching of the object in the CDN is "automatic" in the sense that the user does not necessarily need to request such caching or take any other action such as registering for the CDN service, storing multiple, different (e.g., differently-named) versions of the object, or publishing multiple, different Uniform Resource Locators (URLs) for the object. In various circumstances, such a set-up may be advantageous to a user because this type of set-up provides a user with a "CDN that just works." In other words, the user stores objects in the hosted storage using the hosted storage's normal mechanisms for doing so, and the stored objects are cached, as appropriate, in the CDN without further actions on behalf of the user.

Figure 1:
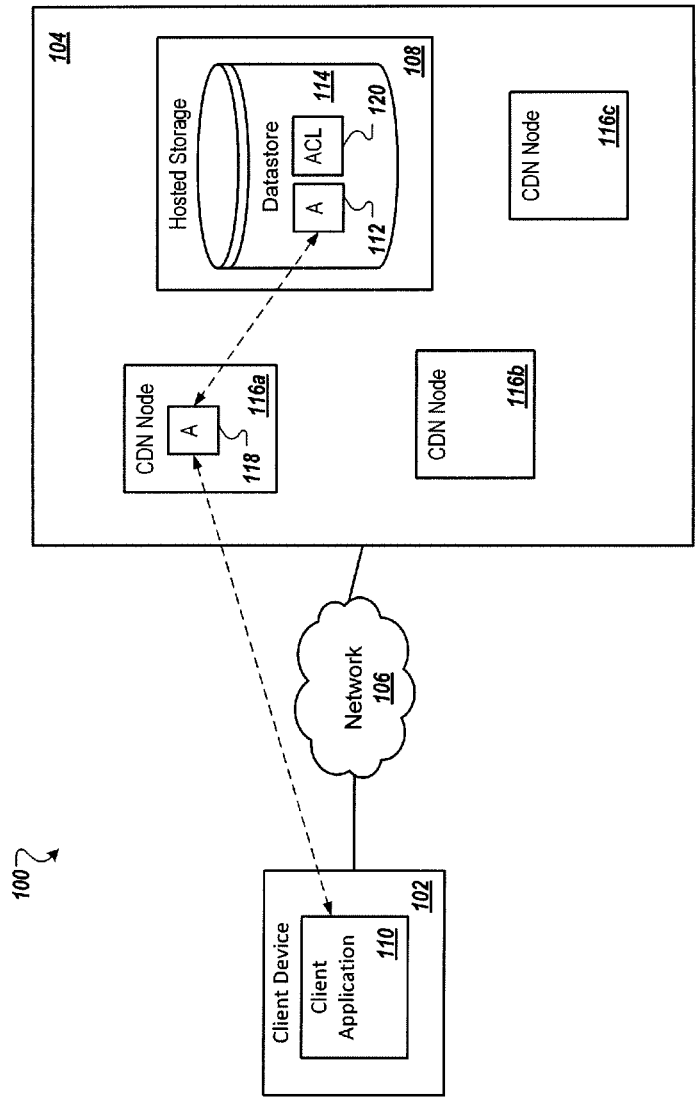
FIG. 1 is a block diagram showing an example of a system for providing hosted storage and accessing the hosted storage from a client device.

FIG. 1 is a block diagram showing an example of a system 100 for providing hosted storage and accessing the hosted storage from a client device. The system 100 includes a client device 102 connected to a server system 104 over a network 106. The network 106 can be, for example, the Internet.

The client device 102 implements a client application 110 by executing instructions on one or more processing devices. In some implementations, the client application 110 may be implemented by more than one client device. In some implementations, the client application 110 may be implemented as a web application running in a web browser. The client application 110 can include functionality to store, retrieve, or otherwise access data on the client device 102, as well as to store, retrieve, or otherwise access data in an off-site, hosted, or cloud based data storage system, such as a hosted storage service 108 included in the server system 104.

Figure 6:
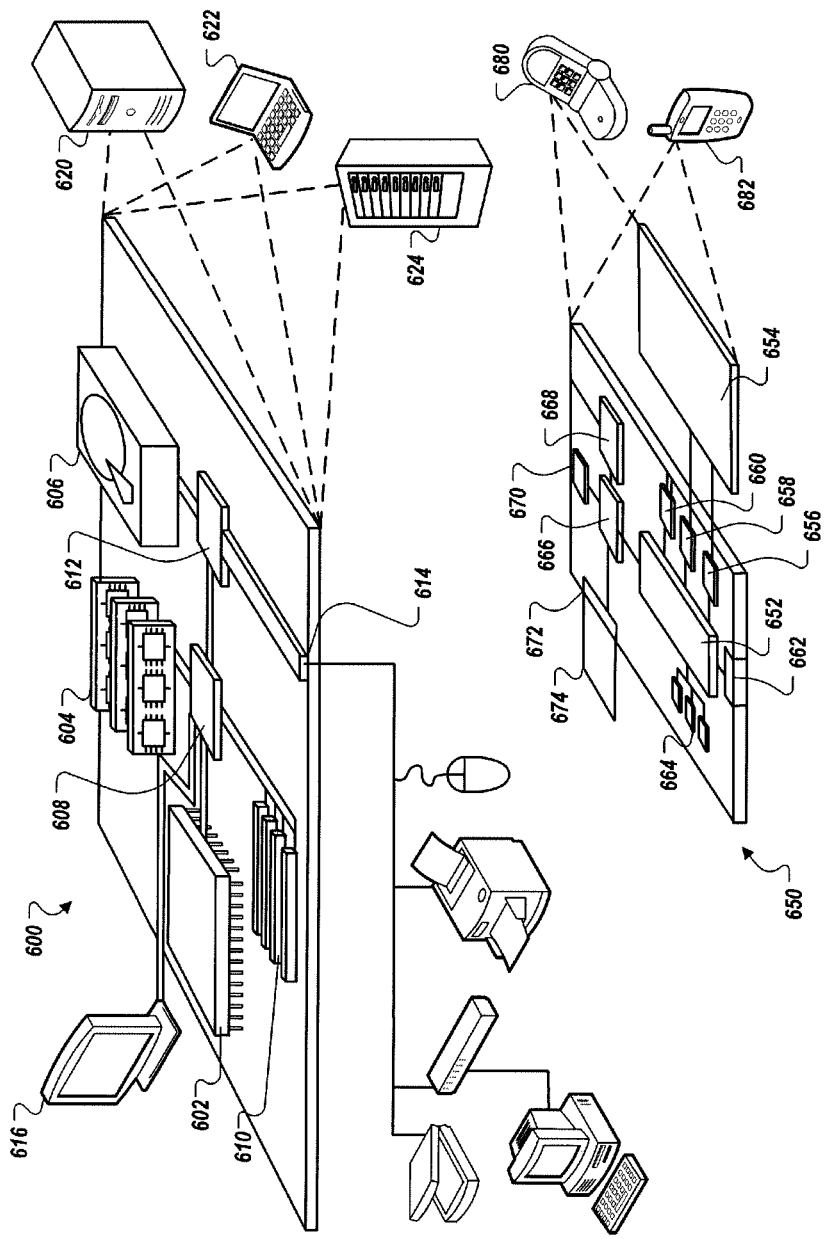
FIG. 6 shows an example of a computing device and a mobile computing device.

The client device 102 can be implemented using a computing device, such as the computing device 600 or the mobile device 650 described with respect to FIG. 6. The client device 102 can communicate across the network 106 using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices 102 communicating across the network 106 with the server system 104.

The server system 104 includes hosted, or cloud-based, storage 108 and a CDN that includes CDN nodes 116a, 116b, and 116c. In some implementations, the server system 104 is owned and operated by a single entity that provides the hosted storage service 108 and the CDN. Although one hosted storage service 108 is shown, some implementations can include multiple hosted storage services.

The hosted storage service 108 can provide access to stored data by applications running on computing devices geographically separate from each other, provide offsite data backup and restore functionality, provide data storage to a computing device with limited storage capabilities, and/or provide storage functionality not implemented on a computing device.

For instance, the hosted storage service 108 can be implemented such that client applications (for example, executing on client device 102) can store, retrieve, or otherwise manipulate data objects in the hosted storage service 108. The hosted storage service 108 can be implemented by one or more server devices, which can be implemented using a computing device, such as the computing device 600 or mobile device 650 described with respect to FIG. 6. For example, the hosted storage service 108 can be implemented by multiple server devices operating in the same, or different, data centers.

The hosted storage service 108 can be implemented as a Web Service with a corresponding set of Web Service Application Programming Interfaces (APIs). The Web Service APIs may be implemented, for example, as a Representational State Transfer (REST)-based Hypertext Transfer Protocol (HTTP) interface or a Simple Object Access Protocol (SOAP)-based interface. Generally, in a REST-based interface, a data object is accessed as a resource, uniquely named using a Uniform Resource Indicator (URI), and the client application and service 108 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 108. The PUT and POST verbs may be used to upload an object to the service 108. PUT requests can come from the client 102 and contain authentication and authorization credentials and object metadata in a header, such as an HTTP header. POST requests can be received when a client 102 wants to upload from a web browser form. The form POST upload protocol for the hosted storage service 108 can involve multiple required form fields to provide authentication, authorization and object metadata. More generally, any of the API requests may include credentials for authentication and authorization, for example, in a header of the request. For example, an authorization header may be included in the REST requests, which includes an access key to identify the entity sending the request. Requests also may include a secure SHA-1 (Secure Hashing Algorithm) HMAC (Hash Message Authentication Code) signature. In general, an Access Control List (ACL) 120 is used to ensure that a user is authorized to perform a requested action on the data object 112 and/or on the bucket including the data object 112.

Objects can be stored in hosted storage service 108 in buckets. A bucket can be used in the hosted storage system 108 to organize stored data objects 112. For example, a bucket can include one or more data objects 112. In some examples, each bucket is uniquely named in the hosted storage service 108, each object is uniquely named in a bucket, and every bucket and object combination is unique. In some implementations, a bucket can include one or more other buckets. In other implementations, a bucket cannot include a bucket.

In general, data objects 112 stored in the hosted storage service 108 can be referenced by object identifiers. The hosted storage service 108 can define namespaces to which a valid object identifier must conform. For example, the namespace can require that object identifiers be a sequence of Unicode characters whose UTF-8 encoding is at most 1024 bytes long. As another example, the namespace can require that object identifiers be globally unique identifiers (GUIDs), which may be 128-bit integers.

In one implementation, objects may be uniquely identified by a URI that includes the bucket name and the object name, and identifies the hosted storage service 108. For example, an object named "long/song.mp3" in a bucket named "music" could be specified using a URI pattern such as http://s.hostedstoragesystem.com/music/long/song.mp3 or http://music.s.hostedstoragesystem.com/long/song.mp3. Alternatively, the user of the client 102 can create a bucket named www.music.org, publish a CNAME alias redirecting that to http://music.s.hostedstoragesystem.com, and address the object as http://www.music.org/long/song.mp3.

As described further below, a first user may use a client system to store data objects in the hosted storage 108, and then set appropriate permissions to make those objects readable by other users and client systems. That first user, as the owner of the object, may be authorized to perform other actions on the object, such as deleting the object, while other users may only be able to perform limited actions, such as reading the object.

For example, a first user may use a client system (either the same as or different from client system 102) to communicate with the hosted storage service 108 to store a data object 112 in a datastore 114 included in the hosted storage service 108.

The first user may designate the object 112 as being publicly available, which means that any other user can retrieve the object. As a result, a second user can subsequently use the client application 110 to retrieve the data object 112 from the datastore 114. As a specific example, the data object 112 may be an image included in a web page and retrieved in response to the second user using the client application 110 to load a web page which references the data object 112.

When users retrieve the data object, the data object 112 may be served from a cache included in one of the CDN nodes 116a, 116b, or 116c. In general, a CDN includes nodes deployed in multiple locations, often over multiple backbones. These nodes cooperate with each other to satisfy requests for content by end users. Requests for content are typically algorithmically directed to nodes that are optimal in some way, such as reducing bandwidth costs or reducing the time it takes to deliver an object to a user (for example, by decreasing latency). For instance, a node may be chosen because the node is the fewest network hops away from the client, the fewest number of network seconds away from the client, geographically the closest to the client, has the highest availability in terms of server performance, is the least expensive cost-wise, or some combination of these and/or other factors.

For example, the CDN node 116a can include a cached copy 118 of the data object 112. The CDN node 116a can be one of multiple CDN nodes, such as CDN nodes 116b and 116c, included in the server system 104. The CDN nodes 116a-116c and possibly other CDN nodes 116 can each be strategically placed at various geographic locations so as to maximize bandwidth for access to data objects included in the server system 104 from multiple, geographically-dispersed client devices 102.

When client device 102 requests the data object 112, for example, the CDN node 116 geographically closest to the client device 102 (e.g., the CDN node 116a) may receive the request for the data object 112. If the CDN node 116a includes a cached copy of the data object 112 (e.g., the cached copy 118), the CDN node 116a can send the cached copy 118 to the client device 102. If the CDN node 116a does not include a cached copy of the data object 112, the CDN node 116a can request the data object 112 from the hosted storage service 108, can receive a copy of the data object 112 from the hosted storage service 108, can cache the copy of the data object 112 (e.g., as the cached copy 118), and can send the copy of the data object 112 to the client device 112.

In some implementations, whether to cache a copy of the data object 112 in the CDN node 116a can be based on various factors. For example, the data object 112 might not be cached if there is not sufficient available space in the CDN node 116a, or if the available space is at or below a threshold level. As another example, a copy of the data object 112 may be cached after a certain number of requests (e.g., three) have been received for the data object 112 within a particular time period. That is, if the data object 112 is rarely requested, a copy of the data object 112 might not be stored in the CDN node 116a. As yet another example, a copy of the data object 112 may be cached in the CDN node 116a if the distance between the hosted storage service 108 and the client device 102 (as measured, for example, by geographic distance or network distance) is more than a threshold distance greater than the distance between the client device 102 and CDN node 116a. As described in more detail below, configuration of the data object 112, such as access permissions and cache-control settings, may also affect whether the data object 112 is cached in the CDN node 116a.

The fact that the data object 112 can be served from a CDN node 116 is transparent to the client application 110 and, potentially, to the user that stored the data object 112 on the hosted storage 108. The client application 110 can issue the same request, using the same URL (Uniform Resource Locator), regardless of whether the data object 112 is retrieved from the CDN node 116a or another CDN node 116, or directly from the hosted storage service 108. The data object 112 can be served from the CDN node 116a without requiring the user who initially stored the data object 112 in the hosted storage service 108 to register for a CDN service, or to store or register multiple, different (e.g., differently-named) versions of the data object 112, or to publish multiple, different Uniform Resource Locators (URLs) for the client application 110 to use to retrieve the data object 112. When storing the data object 112 in the hosted storage service 108, a single copy of the data object 112 can exist in the hosted storage service 108 (e.g., the hosted storage service 108 does not store a second copy of the data object 112 to support serving of the data object 112 through a CDN).

In other words, in some implementations, the owner of the data object 112 may store the data object on the hosted storage with a particular name or object reference (for example, in the format described above). Rather than making a copy of the object 112 on the hosted storage with a different name or reference for use in the CDN network, the user need only set the permissions of the object appropriately for the object to be cached in a CDN node, such as node 116a, 116b, or 116c. As a result, the same name or reference is used when retrieving the object 112, regardless of whether the object is served from a CDN node 116a, 116b, or 116c or the hosted storage 108, rather than using one name or reference for addressing the object in the hosted storage 108 and another name or reference (corresponding to a copy of the object in hosted storage 108) when the object is to be retrieved from the CDN network.

In this case, for instance, an owner of the object need only store the object in the hosted storage service 108 with an object reference, and that same reference can be used to retrieve the object, regardless of whether the object is served from a cache in a CDN node 116a, 116b, or 116c, or from the hosted storage service 108. The caching of the object may be "automatic" in the sense that the user does not necessarily need to request such caching, but, rather, simply stores the object and sets permissions as appropriate. The system 104 then caches objects appropriately in the CDN nodes 116a, 116b, or 116c.

In some implementations, the data object 112 is eligible to be cached in one or more CDN nodes 116 if the data object 112 is configured to be publicly accessible. For example, the data object 112 can be publicly accessible if an ACL (Access Control List) 120 associated with the data object 112 is configured so that an anonymous user can read the data object 112. In some implementations, data objects 112 that are not publicly accessible are not cached in the CDN nodes 116. In some implementations, the data object 112 is eligible to be cached in one or more of the CDN nodes 116 if a cache-control parameter associated with the data object 112 does not specify that caching is disallowed. In such implementations, if the cache control parameter associated with the data object 112 specifies that caching is disallowed, the data object 112 is not cached in the CDN nodes 116. In some implementations, the data object 112 is not cached in the CDN nodes 116 unless the data object 112 is both publicly accessible and the cache control parameter associated with the data object 112 does not specify that caching is disallowed.

In some implementations, the ACL may be stored at or otherwise accessible to the CDN nodes 116, which may use the ACL to determine whether or not the object is publicly accessible. If a CDN node determines that the object is not publicly accessible, the CDN node then may refrain from caching the object. On the other hand, if the CDN node determines the object is publicly accessible, the CDN node then may cache the object. In some implementations, criteria other than public accessibility may be required before an object is cached. In this case, the CDN node may verify that the other criteria apply before caching the object. Alternatively, or additionally, as described below, in some implementations the hosted storage may use the ACL to determine whether the object is publicly accessible, and mark a cache-header as appropriate depending whether the object is publicly accessible (and, in some cases, whether other criteria is met). If the cache-header indicates that the object is not cacheable (for instance, because it is not publicly accessible), then the CDN node may refrain from caching the object and, conversely, may cache the object if the cache-header indicates the object is cacheable.

The data object 112 may be an immutable collection of bytes. For example, in some implementations, the data object 112 can be replaced, but the content of the data object 112 cannot be incrementally modified. A data object 112 can have associated metadata. For example, metadata for the data object 112 can include the ACL 120, a cache control parameter, size, and other information.

The hosted storage service 108 can include a single type of datastore 114, or multiple types of datastores 114. For example, in implementations where a single type of datastore 114 is used, data that is stored by the hosted storage service 108 can be received, managed, and stored in the same way. For example, all data in the datastore 114 can be stored as Binary Large Objects (BLOBs). As another example, in implementations where multiple types of datastores 114 are used, each datastore 114 used can have different requirements, limits, available functions, and performance profiles, for example. For instance, a first datastore can provide fast access to small data objects, and can automatically build multiple search indexes to support different access methods (e.g., data can be stored in a database format). By comparison, a second datastore can accept much larger data objects, store those objects more efficiently on disk (e.g. by including less fragmentation of objects for faster disk reading), but cannot ensure speedy searching (e.g., the second datastore can store data as BLOBs). In this example, a destination datastore (e.g., the first datastore or the second datastore) for data sent from the client application 104 can be selected based on the type, size, and expected use of the data.

A hosted storage service 108 that has multiple types of datastores 114 can provide a single access protocol for accessing the service, and the service can determine which datastore 114 is used. For instance, the hosted storage service 108 can provide a single access protocol to store, retrieve, or otherwise manipulate a data object, with the hosted storage service 108 selecting which of multiple datastores 114 is to be used to store a data object (or components of a data object). Alternatively, the hosted storage service 108 can have different access protocols for the different types of datastores 114. For example, there can be one access protocol for a first datastore 114 and a different access protocol for a second datastore 114.

Figure 2:
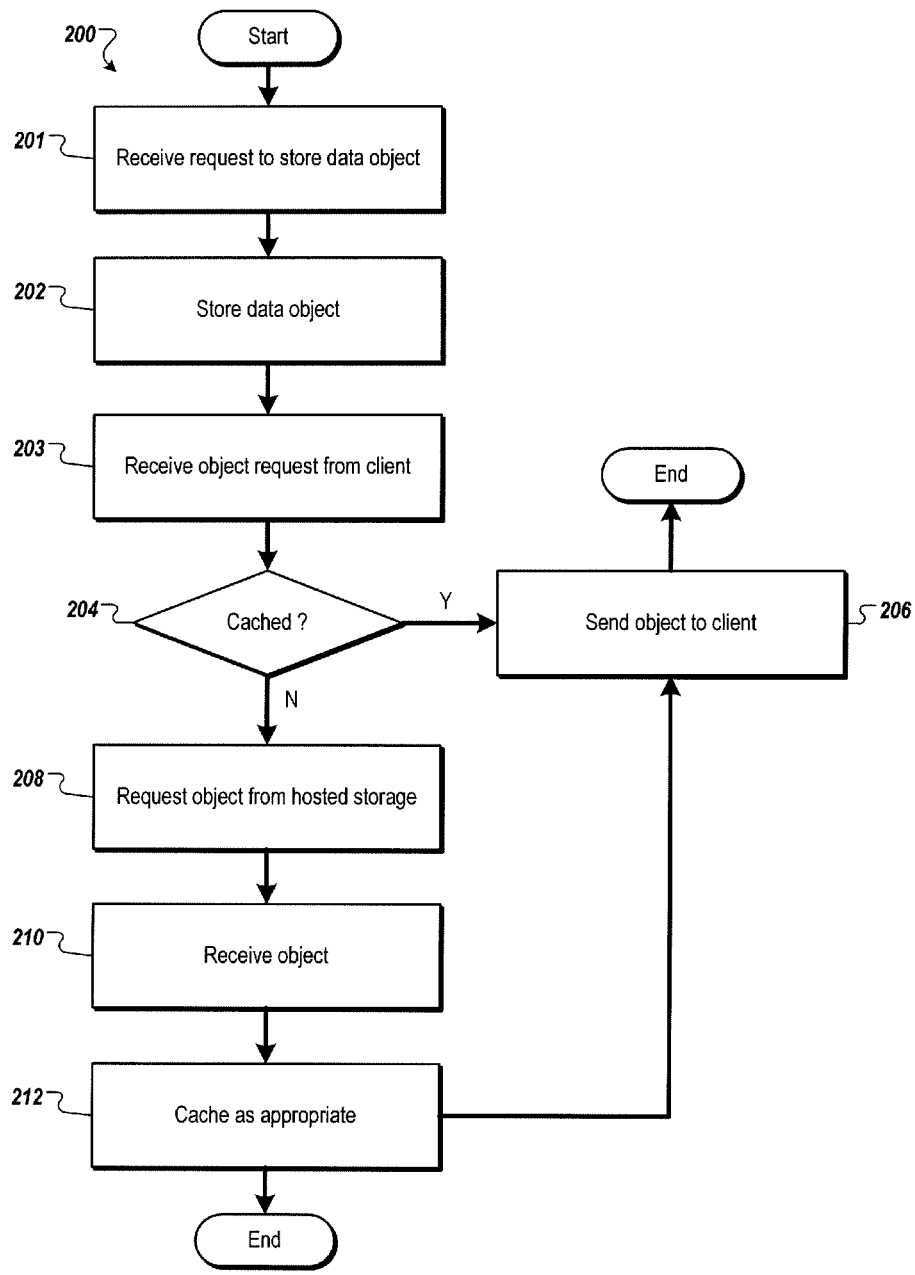
FIG. 2 is a flow chart showing an example of a process for sending a data object to a client.

FIG. 2 is a flow chart showing an example of a process 200 for receiving and sending a data object. The process 200 can be performed by, for example, the CDN node 116a, and for clarity of presentation, the description that follows uses the system 100 as the basis for describing the process 200. However, another system, or combination of systems, may be used to perform the process 200.

The hosted storage service 108 receives a request to store a data object (201). The request is associated with the data object and an object reference associated with the object. For example, the request itself may include the data object and the associated object reference. The object reference enables retrieval of the data object from the hosted storage service 108. For example, the hosted storage service 108 can receive a request from the client device 102 to store the data object 112. The request can include an object reference, which can be, for example, a URI, as described above.

The data object is stored at the hosted storage service 108, in association with the object reference (202). For example, as described above, in response to receiving the request to store the object, hosted storage service 108 can store the data object 112 in one of a variety of formats, such as in a database format or a BLOB format. The hosted storage service 108 can determine which storage format to use.

The CDN node 116a receives a request for a data object from the client application 110 (203). For example, the CDN node 116a can receive an HTTP request from the client application 110, where the HTTP request includes a request for the data object 112. The request may be a REST-based request that includes a verb such as "GET" and identifies the object by an object reference that, for example, includes bucket name and object name.

The CDN node 116a determines whether the data object is cached at the CDN node 116a (204). For example, the CDN node 116a can extract a data object reference from the received HTTP request and can determine whether a data object having the same data object reference is included in a cache of the CDN node 116a. For example, the CDN node 116a can determine that a cache of the CDN node 116a includes the cached copy 118 of the data object 112 with the same object reference.

If the data object is cached at the CDN node 116a, the CDN node 116a sends the data object to the client application 110 (206). For example, the CDN node 116a can send the cached copy 118 of the data object 112 to the client application 110 using an HTTP response.

If the data object is not cached at the CDN node 116a, the CDN node 116a requests the data object from the hosted storage service 108 (208). For example, the CDN node 116a can send an HTTP request to the hosted storage service 108, requesting the data object 112, using the same object reference that was received from the CDN node, which is the same object reference used by the owner of the object to initially store the object in the hosted storage service 108.

The CDN node 116a receives the data object from the hosted storage service 108 (210). For example, the CDN node 116a can receive the data object 112 from the hosted storage service 108 in an HTTP response. Before sending the data object 112, the hosted storage service 108 can verify that user credentials included in the HTTP request received from the CDN node 116a enable access to the data object 112 (e.g., according to the ACL 120).

The CDN node 116a caches the data object as appropriate (212) and sends the data object to the client application 110 (206). For example, the CDN node 116a can send the data object 112 to the client application 110 using an HTTP response. The CDN node 116a can examine a cache-control header included in an HTTP response received from the hosted storage service 108 to determine whether to cache the data object 112 in the CDN node 116a. If the cache-control header specifies that caching is not allowed, the CDN node

116a does not cache the data object 112. If the cache control header does not specify that caching is disallowed, the CDN node 116a can cache the data object 112 in a cache included in the CDN node 116a. Caching may not be allowed, for example, if the data object is not publicly accessible.

Figure 3:
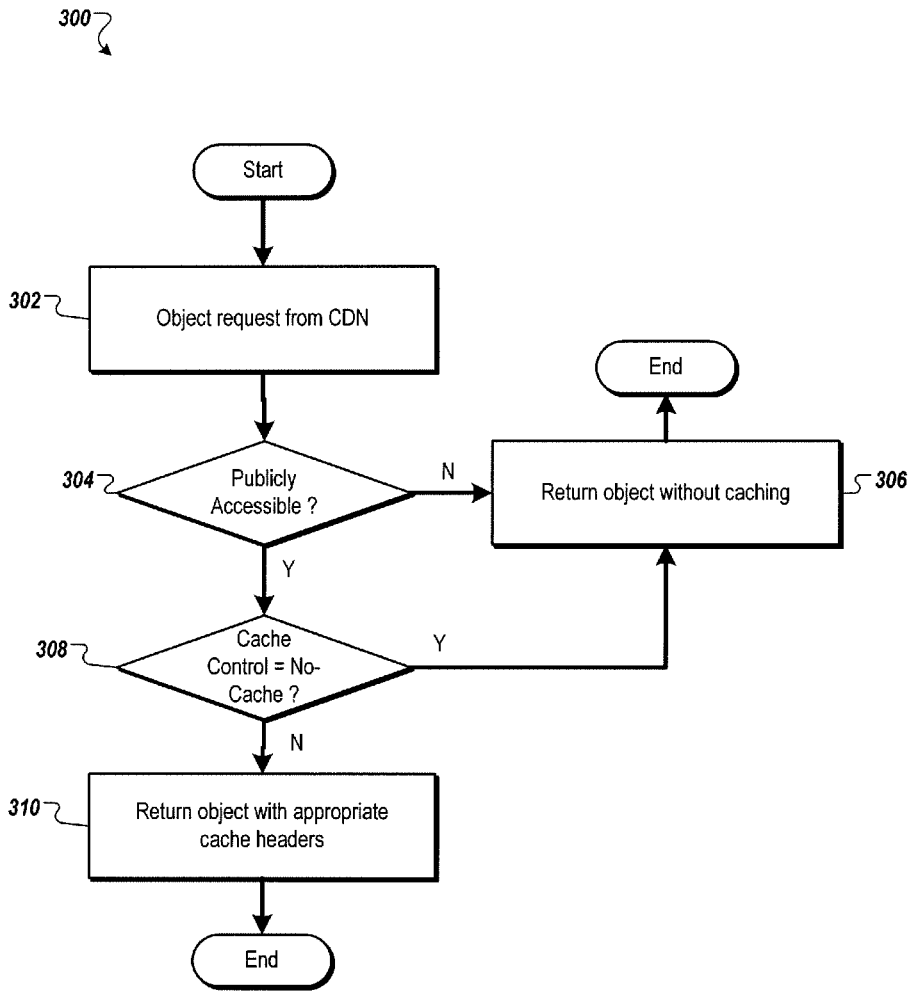
FIG. 3 is a flow chart showing an example of a process for sending a data object to a content delivery network node.

FIG. 3 is a flow chart showing an example of a process 300 for sending a data object to a content delivery network node. The process 300 can be performed by, for example, the hosted storage service 108, and for clarity of presentation, the description that follows uses the system 100 as the basis for describing the process 300. However, another system, or combination of systems, may be used to perform the process 300.

The hosted storage service 108 receives a request for a data object from the CDN node 116a (302). For example, the CDN node 116a can request the data object 112 from the hosted storage service if the CDN node 116a determines that the data object 112 is not cached in the CDN node 116a. The hosted storage service 108 can receive, for example, an HTTP request from the CDN node 116a.

The hosted storage service 108 determines whether the data object is publicly accessible (304). For example, the hosted storage service 108 can determine whether the data object 112 is publicly accessible by examining the ACL 120 which is associated with the data object 112. For example, the hosted storage service 108 can determine whether the ACL 120 specifies that an anonymous user can read the data object 112.

If the data object is not publicly accessible, the hosted storage service 108 sends the data object to the CDN node 116a without caching (306). For example, the hosted storage service 108 can send the data object 112 to the CDN node 116a using an HTTP response and can configure a cache-control header included in the HTTP response to specify no caching. The CDN node 116a can read and comply with the cache-control header (e.g., the CDN node 116a can receive the data object 112 without caching the data object 112).

If the data object is publicly accessible, the hosted storage service 108 determines whether a cache-control setting for the data object indicates that caching is disallowed for the data object (308). For example, the hosted storage service 108 can access the cache-control parameter from metadata associated with the data object 112.

If the cache-control setting for the data object indicates that caching is disallowed for the data object, the hosted storage service 108 sends the data object to the CDN node 116a without caching (306). For example, the hosted storage service 108 can send the data object 112 to the CDN node 116a using an HTTP response and can configure a cache-control header included in the HTTP response to specify no caching. The CDN node 116a can read and comply with the cache-control header (e.g., the CDN node 116a can receive the data object 112 without caching the data object 112).

If the cache control setting for the data object indicates that caching is not disallowed for the data object, the hosted storage service 108 sends the data object to the CDN node 116a with appropriate cache headers (310). For example, the hosted storage service 108 can send the data object 112 to the CDN node 116a using an HTTP response and can configure a cache-control header included in the HTTP response which specifies a length of time to cache the data object 112, and possibly other cache-control information.

Figure 4:
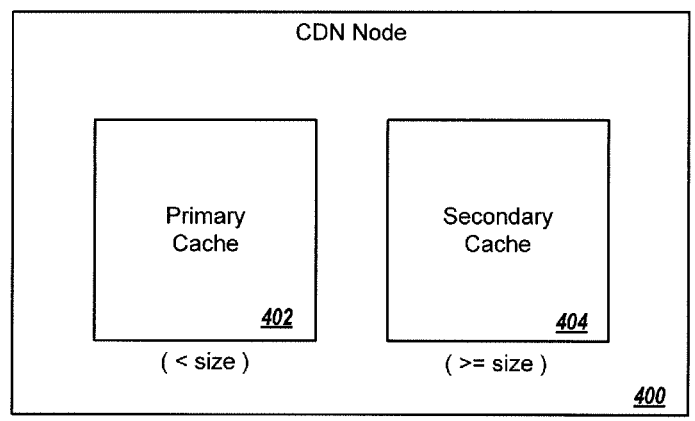
FIG. 4 is a block diagram showing an example of a content delivery network node.

FIG. 4 is a block diagram showing an example of a content delivery network node 400. The CDN node 400 includes a primary cache 402 and a secondary cache 404. The primary cache 402 can be used, for example, for caching and serving data objects under a predetermined size (e.g., two megabytes). The secondary cache 404 can be used, for example, for caching and serving data objects having a size greater than the predetermined size. The primary cache 402 can provide fast access to small data objects, while the secondary cache 404 can store large data objects more efficiently on disk than the primary cache 402 and/or may include mechanisms to reliably send larger (greater than the predetermined size) to client systems over the network 106. For example, the secondary cache 404 can store large data objects in a manner which involves less fragmentation of data objects, which results in faster disk reading. For example, data objects in the secondary cache 404 can be stored as BLOBs. Whether to store a data object in the primary cache 402 or the secondary cache 404 can be determined based on the size of the data object.

Figure 5:
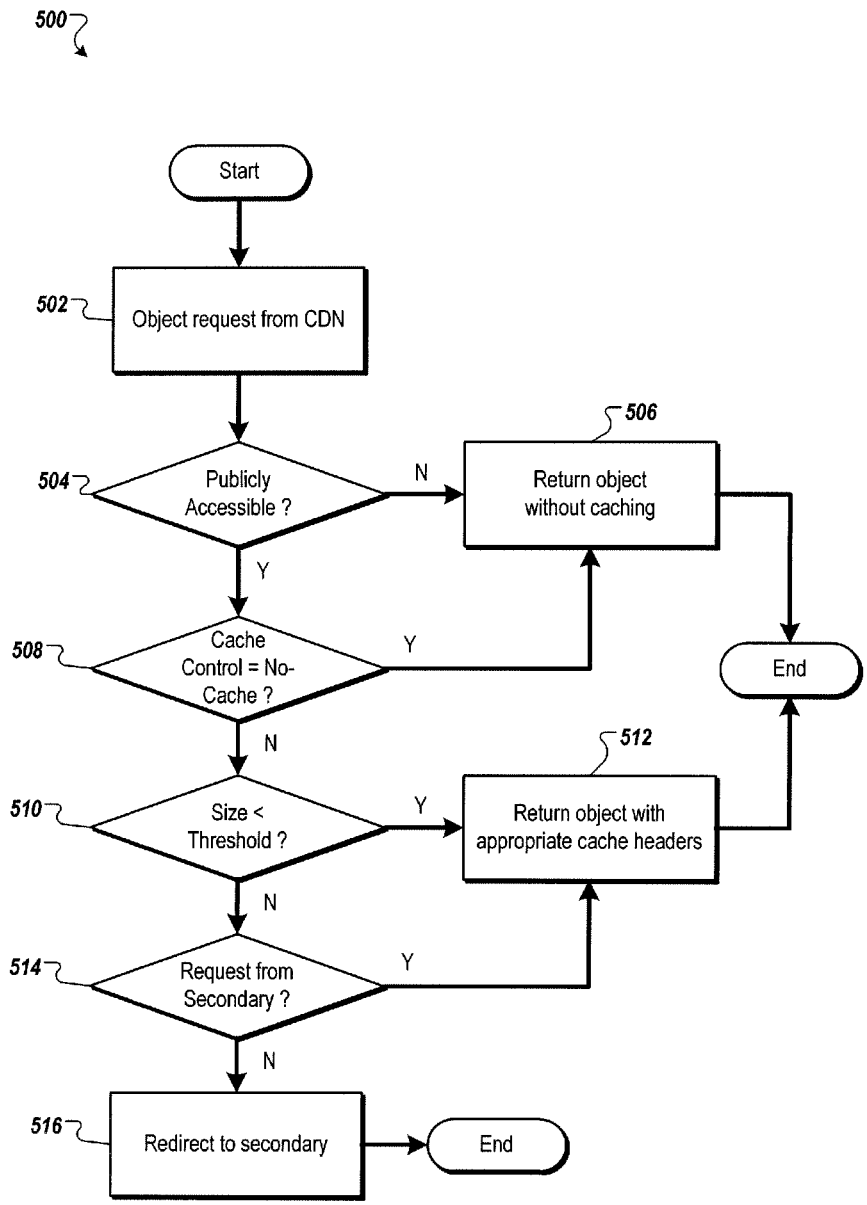
FIG. 5 is a flow chart showing an example of a process for sending a data object to a content delivery network node.

FIG. 5 is a flow chart showing an example of a process 500 for sending a data object to a content delivery network node. The process 500 can be performed by, for example, the hosted storage service 108, and for clarity of presentation, the description that follows uses the system 100, with a CDN node implemented as shown in FIG. 4, as the basis for describing the process 500. However, another system, or combination of systems, may be used to perform the process 500.

The hosted storage service 108 receives a request for a data object from a CDN node (502). For example, the hosted storage service 108 can receive an HTTP request for the data object 112 from the CDN node 400 (described with respect to FIG. 4). In general, the request from the CDN node 400 may originate from the primary cache 402 or the secondary cache 404. In one implementation, initial requests for an object from a client application 110 are received at the primary cache 402 and, if the object is not cached in the primary cache 402, a request for the object may be sent from the primary cache 402 to the hosted storage service 108 for the object. In the event the hosted storage service 108 causes the client application 110 to be redirected to the secondary cache 404, as described below, another request may be received from the client application 110 at the secondary cache 404. If the object is not cached in the secondary cache 404, a request for the object may be sent from the secondary cache 404 to the hosted storage service 108 for the object. Thus, in this case, the request may be received from the primary cache 402 or the secondary cache 404, depending on which cache received the request from the client application 110.

The hosted storage service 108 determines whether the data object is publicly accessible (504). For example, the hosted storage service 108 can determine whether the data object 112 is publicly accessible by examining the ACL 120 which is associated with the data object 112. For example, the hosted storage service 108 can determine whether the ACL 120 specifies that an anonymous user can read the data object 112.

If the data object is not publicly accessible, the hosted storage service 108 sends the data object to the CDN node 400 without caching (506). For example, the hosted storage service 108 can send the data object 112 to the CDN node 400 using an HTTP response and can configure a cache-control header included in the HTTP response to specify no caching. The CDN node 400 can read and comply with the cache-control header (e.g., the CDN node 116a can receive the data object 112 without caching the data object 112).

If the data object is publicly accessible, the hosted storage service 108 determines whether a cache control setting for the data object indicates that caching is disallowed for the data object (508). For example, the hosted storage service 108 can access the cache-control parameter from metadata associated with the data object 112.

If the cache control setting for the data object indicates that caching is disallowed for the data object, the hosted storage service 108 sends the data object to the CDN node 400 without caching (506). For example, the hosted storage service 108 can send the data object 112 to the CDN node 400 using an HTTP response and can configure a cache-control header included in the HTTP response to specify no caching. The CDN node 400 can read and comply with the cache-control header (e.g., the CDN node 116a can receive the data object 112 without caching the data object 112).

If the cache control setting for the data object indicates that caching is not disallowed for the data object, the hosted storage service 108 determines whether the size of the data object is less than a threshold (510). The threshold may be, for example, two megabytes. The hosted storage service 108 can determine the size of the data object 112, for example, by examining metadata associated with the data object 112.

If the size of the data object is less than a threshold, the hosted storage service 108 returns the data object to the CDN node 400 and, in particular, the primary cache (assuming, for example, that initial requests for an object are issued from the primary cache) with appropriate cache headers (512). For example, the hosted storage service 108 can send the data object 112 to the CDN node 400 using an HTTP response and can configure a cache-control header included in the HTTP response which specifies a length of time to cache the data object 112, and possibly other cache-control information. The CDN node 400 can, for example, cache the data object 112 in the primary cache 402 (e.g., so that subsequent requests for the data object 112 are served from the primary cache 402).

If the size of the data object is not less than a threshold, the hosted storage service 108 determines whether the request for the data object originated from a secondary cache (514). For example, the hosted storage service 108 can determine whether the request for the data object 112 originated from the secondary cache 404 by examining an origin domain included in a header of the request, or by determining whether an IP (Internet Protocol) address associated with the request is included in a set of recognized IP addresses. The request for the data object 112 can originate from the secondary cache 404, for example, due to a redirect sent to the client application 110, where the redirect directs the client application 110 to request the data object 112 from the secondary cache 404 (e.g., so that subsequent requests for the data object 112 are served from the secondary cache 404).

If the request for the data object originated from the secondary cache, the hosted storage service 108 returns the data object to the CDN node 400 and, in particular, to the secondary cache with appropriate cache headers (512). For example, the hosted storage service 108 can send the data object 112 to the CDN node 400 using an HTTP response and can configure a cache-control header included in the HTTP response which specifies a length of time to cache the data object 112, and possibly other cache-control information. The CDN node 400 can, for example, cache the data object 112 in the secondary cache 404.

If the request for the data object did not originate from the secondary cache, the hosted storage service 108 redirects the request for the data object to the secondary cache (516). For example, the hosted storage service 108 can send a redirect request to the CDN node 400, which, in turn, sends an HTTP response with a status code of "302" to the client application 110, indicating a redirect to the secondary cache 404. The client application 110 would then send a request for the object directed to the secondary cache, which would result in the hosted storage service 108 sending the object to the secondary cache (512) after determining the request for the object was received from the secondary cache (514).

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. That the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while two tiers of cache have been described, other implementations may have any number of cache tiers. In addition, even though the size of the object has been described as a metric for choosing the tiered cache from which the object is delivered, other metrics may additionally or alternatively include type of the object or the proximity of the cache to users. In addition, the logic flows depicted in the figures do not require the particular order shown, or sequential order, to achieve desirable results. In addition, other actions may be provided, or actions may be eliminated, from the described flows, and other components may be added to, or removed from, the described systems.

The invention claimed is:

1. A method comprising:
receiving, at a hosted storage service, a request to store a data object, wherein the request is associated with the data object and an object reference, the object reference enabling retrieval of the data object from the hosted storage service;
storing, at the hosted storage service, the data object in association with the object reference;
storing an access control list in association with the data object, wherein the access control list designates permissions for the data object;
determining that the accessed access control list designates the data object as publicly accessible;
storing a cache control parameter in association with the data object, the cache control parameter indicating whether the data object is cacheable;
determining that the accessed cache control parameter indicates the data object is cacheable; and
in response to determining that that the access control list designates the data object as publicly accessible and that that the cache control parameter indicates the data object as cacheable, sending the data object from the hosted storage service to a content delivery network node such that the data object is cached in and retrievable from the content delivery network node using the object reference;
receiving, at a hosted storage service, a request to store a second data object, wherein the request is associated with the second data object and a second object reference, the second object reference enabling retrieval of the second data object from the hosted storage service;
storing, at the hosted storage service, the second data object in association with the second object reference;
storing a second access control list in association with the second data object, the second access control list designating permissions for the second data object;
determining that the second access control list does not designate the second data object as publicly accessible;
storing a second cache control parameter in association with the second data object, the second cache control parameter designating the second data object as cacheable; and
in response to determining that that the accessed second access control list does not designate the second data object as publicly accessible, sending the second data object from the hosted storage service to a content delivery network node such that the second data object is not cached in and retrievable from the content delivery network node using the second object reference.

2. The method of claim 1 wherein sending the data object from the hosted storage service to the content delivery network node comprises sending the data object from the hosted storage service to the content delivery network node without requiring a user to request the sending of the object from the hosted storage service to the content delivery network node.

3. The method of claim 1 wherein sending the data object from the hosted storage service to the content delivery network node such that the data object is cached in the content delivery network is performed without action by an owner of the data object other than causing the data object to be stored in the hosted storage service and designated as publicly accessible.

4. The method of claim 1 wherein sending the data object from the hosted storage service to a content delivery network node comprises:

receiving a request to retrieve the data object at the content delivery network node, the request to retrieve the data object including the object reference;

determining, at the content delivery network node, that the data object is not cached at the content delivery network node;

in response to determining that the data object is not cached at the content delivery network node, sending a request for the data object from the content delivery network node to the hosted storage service, the request for the data object including the object reference;

receiving the request for the data object at the hosted storage service;

retrieving the data object at the hosted storage service using the object reference received with the request for the data object; and sending the retrieved data object to the content delivery network node such that the data object is cached in and retrievable from the content delivery network node using the object reference.

5. The method of claim 4 wherein sending the retrieved data object to the content delivery network such that the data object is cached includes sending the data object with a cache header that indicates the object is cacheable.

6. The method of claim 1 wherein the content delivery network node includes a primary cache configured to cache data objects below a threshold size and a secondary cache configured to cache data objects above the threshold size.

7. The method of claim 6 wherein the data object is above the threshold size and sending the data object from the hosted storage service to a content delivery network node comprises:

receiving a request to retrieve the data object at the primary cache, the request to retrieve the data object including the object reference;

determining, at the primary cache, that the data object is not cached at the primary cache;

in response to determining that the data object is not cached at the primary cache, sending a first request for the data object from the primary cache to the hosted storage service, the first request for the data object including the object reference;

receiving the first request for the data object at the hosted storage service;

determining that the data object is above the threshold size and that the first request was received from the primary cache;

in response to determining that the data object is above the threshold size and that the first request was received from the primary cache, redirecting the request to retrieve the data object to the secondary cache;

receiving the redirected request to retrieve the data object at the secondary cache, the redirected request to retrieve the data object including the object reference;

determining, at the secondary cache, that the data object is not cached at the secondary cache;

in response to determining that the data object is not cached at the secondary cache, sending a second request for the data object from the secondary cache to the hosted storage service, the second request for the data object including the object reference;

retrieving the data object at the hosted storage service using the object reference received with the second request for the data object; and sending the retrieved data object to the secondary cache such that the data object is cached in and retrievable from the secondary cache using the object reference.

8. The method of claim 1 further comprising:

receiving from a client system and at the content delivery network node, a request for the data object, the request including the object reference;

retrieving the data object cached at the content delivery network node using the object reference received with the request for the data object; and sending the retrieved data object to the client system.

9. The method of claim 1 wherein the object reference includes a bucket name and an object name.

10. A system comprising:

one or more processing devices;

one or more storage devices storing instructions that, when executed by the one or more processing devices, cause the one or more processing devices to:

receive, at a hosted storage service, a request to store a data object, wherein the request is associated with the data object and an object reference, the object reference enabling retrieval of the data object from the hosted storage service;

store, at the hosted storage service, the data object in association with the object reference;

store an access control list in association with the data object, wherein the access control list designates permissions for the data object;

determine that the access control list designates the data object as publicly accessible;

store a cache control parameter in association with the data object, the cache control parameter indicating whether the data object is cacheable;

determine that the cache control parameter indicates the data object is cacheable; and in response to determining that that the access control list designates the data object as publicly accessible and that that the cache control parameter indicates the data object as cacheable, send the data object from the hosted storage service to a content delivery network node such that the data object is cached in and retrievable from the content delivery network node using the object reference;

receive, at a hosted storage service, a request to store a second data object, wherein the request is associated with the second data object and a second object reference, the second object reference enabling retrieval of the second data object from the hosted storage service;

store, at the hosted storage service, the second data object in association with the second object reference;

store a second access control list in association with the second data object, the second access control list designating permissions for the second data object;

determine that the second access control list does not designate the second data object as publicly accessible;

store a second cache control parameter in association with the second data object, the second cache control parameter designating the second data object as cacheable; and in response to determining that that the accessed second access control list does not designate the second data object as publicly accessible, send the second data object from the hosted storage service to a content delivery network node such that the second data object is not cached in and retrievable from the content delivery network node using the second object reference.

11. The system of claim 10 wherein, to send the data object from the hosted storage service to the content delivery network node, the instructions include instructions that cause the one or more processing devices to send the data object from the hosted storage service to the content delivery network node without requiring a user to request the sending of the object from the hosted storage service to the content delivery network node.

12. The system of claim 10 wherein the instructions cause the one or more processing devices to perform the sending of the data object from the hosted storage service to the content delivery network node such that the data object is cached in the content delivery network without action by an owner of the data object other than causing the data object to be stored in the hosted storage service and designated as publicly accessible.

13. The system of claim 10 wherein, to send the data object from the hosted storage service to a content delivery network node, the instructions include instructions that cause the one or more processing devices to:
  receive a request to retrieve the data object at the content delivery network node, the request to retrieve the data object including the object reference;
  determine, at the content delivery network node, that the data object is not cached at the content delivery network node;
  in response to determining that the data object is not cached at the content delivery network node, send a request for the data object from the content delivery network node to the hosted storage service, the request for the data object including the object reference;
  receive the request for the data object at the hosted storage service;
  retrieve the data object at the hosted storage service using the object reference received with the request for the data object; and
  send the retrieved data object to the content delivery network node such that the data object is cached in and retrievable from the content delivery network node using the object reference.

14. The system of claim 13 wherein to send the retrieved data object to the content delivery network such that the data object is cached, the instructions include instructions that cause the one or more processing devices to send the data object with a cache header that indicates the object is cacheable.

15. The system of claim 10 wherein the content delivery network node includes a primary cache configured to cache data objects below a threshold size and a secondary cache configured to cache data objects above the threshold size.

16. The system of claim 15 wherein the data object is above the threshold size and, to send the data object from the hosted storage service to a content delivery network node, the instructions include instructions that cause the one or more processing devices to:
  receive a request to retrieve the data object at the primary cache, the request to retrieve the data object including the object reference;
  determine, at the primary cache, that the data object is not cached at the primary cache;
  in response to determining that the data object is not cached at the primary cache, send a first request for the data object from the primary cache to the hosted storage service, the first request for the data object including the object reference;
  receive the first request for the data object at the hosted storage service;
  determine that the data object is above the threshold size and that the first request was received from the primary cache;
  in response to determining that the data object is above the threshold size and that the first request was received from the primary cache, redirect the request to retrieve the data object to the secondary cache;
  receive the redirected request to retrieve the data object at the secondary cache, the redirected request to retrieve the data object including the object reference;
  determine, at the secondary cache, that the data object is not cached at the secondary cache;
  in response to determining that the data object is not cached at the secondary cache, send a second request for the data object from the secondary cache to the hosted storage service, the second request for the data object including the object reference;
  retrieve the data object at the hosted storage service using the object reference received with the second request for the data object; and
  send the retrieved data object to the secondary cache such that the data object is cached in and retrievable from the secondary cache using the object reference.

17. The system of claim 10 wherein the instructions further comprise instructions that cause the one or more processing devices to:
  receive, from a client system and at the content delivery network node, a request for the data object, the request including the object reference;
  retrieve the data object cached at the content delivery network node using the object reference received with the request for the data object; and
  send the retrieved data object to the client system.

18. The system of claim 10 wherein the object reference includes a bucket name and an object name.

19. A system comprising:
  a hosted storage service in which a data object is stored in association with an object reference, the hosted storage service configured to:
    store an access control list in association with the data object, wherein the access control list designates permissions for the data object;
    determine that the access control list designates the data object as publicly accessible;
    store a cache control parameter in association with the data object, the cache control parameter indicating whether the data object is cacheable;
    determine that the cache control parameter indicates the data object is cacheable; and
    in response to determining that that the access control list designates the data object as publicly accessible and that that the cache control parameter indicates the data object as cacheable, send the data object from the hosted storage service to a content delivery network node such that the data object is cached in and retrievable from the content delivery network node using the object reference;
    receive, at a hosted storage service, a request to store a second data object, wherein the request is associated with the second data object and a second object reference, the second object reference enabling retrieval of the second data object from the hosted storage service;
    store, at the hosted storage service, the second data object in association with the second object reference;
    store a second access control list in association with the second data object, the second access control list designating permissions for the second data object;
    determine that the second access control list does not designate the second data object as publicly accessible;

store a second cache control parameter in association with the second data object, the second cache control parameter designating the second data object as cacheable; and in response to determining that that the accessed second access control list does not designate the second data object as publicly accessible, send the second data object from the hosted storage service to a content delivery network node such that the second data object is not cached in and retrievable from the content delivery network node using the second object reference;

a content delivery network node configured to receive the data object sent from the host storage service and cache the received data object such that the data object is retrievable from the content delivery network node using the object reference;

receive the second data object from the host storage service and not cache the received data object; and a client system configured to send a request for the data object, including the object reference, to the content delivery network node such that the content delivery network node retrieves the cached data object using the object reference and sends the cached data object to the client system.

20. The system of claim 19 wherein the host storage service is configured to send the data object to the content delivery network node without requiring a user to request the sending of the object from the hosted storage service to the content delivery network node.

21. The method of claim 1 wherein determining that the accessed access control list designates the data object as publicly accessible comprises determining that the accessed access control list specifies that an anonymous user can read the data object.

* * * * *